(12) United States Patent
Bouti

(10) Patent No.: US 6,524,093 B2
(45) Date of Patent: Feb. 25, 2003

(54) FLOW DEFLECTOR IN AN INJECTION MOLDING SYSTEM

(75) Inventor: Abdeslam Bouti, Swanton, VT (US)

(73) Assignee: Husky Injection Molding Systems, Ltd., Bolton (CA)

( * ) Notice: Subject to any disclaimer, the term of this patent is extended or adjusted under 35 U.S.C. 154(b) by 0 days.

(21) Appl. No.: 09/745,358

(22) Filed: Dec. 21, 2000

(65) Prior Publication Data

US 2002/0081348 A1 Jun. 27, 2002

Related U.S. Application Data

(63) Continuation-in-part of application No. 09/733,349, filed on Dec. 8, 2000.

(51) Int. Cl.⁷ .............................................. B29C 45/23
(52) U.S. Cl. ......................................... 425/549; 425/564
(58) Field of Search .......................... 425/549, 562, 425/563, 564, 565, 566

(56) References Cited

U.S. PATENT DOCUMENTS

| | | | |
|---|---|---|---|
| 4,026,518 A | 5/1977 | Gellert | 251/330 |
| 4,268,240 A | 5/1981 | Rees et al. | 425/548 |
| 4,303,382 A | 12/1981 | Gellert | 425/566 |
| 4,433,969 A | 2/1984 | Gellert | 425/564 |
| 4,443,178 A | 4/1984 | Fujita | 425/564 |
| 4,705,473 A | 11/1987 | Schmidt | 425/549 |
| 4,932,858 A | 6/1990 | Gellert | 425/564 |
| 5,334,010 A | 8/1994 | Teng | 425/563 |
| 5,518,393 A | 5/1996 | Gessner | 425/549 |
| 5,545,028 A * | 8/1996 | Hume | 425/549 |
| 5,834,041 A | 11/1998 | Sekine et al. | 425/549 |
| 5,849,343 A | 12/1998 | Gellert et al. | 425/549 |
| 5,891,381 A | 4/1999 | Bemis et al. | 264/328.8 |

FOREIGN PATENT DOCUMENTS

DE      2259818      7/1974      B29F/1/12

* cited by examiner

*Primary Examiner*—Tim Heitbrink
(74) *Attorney, Agent, or Firm*—Katten Muchin Zavis Rosenman

(57) ABSTRACT

A flow deflector apparatus and method in an injection molding system which transitions a flowing medium around an obstruction, said flowing medium exhibiting reduced stagnation points and substantially uniform flow characteristics downstream of the obstruction.

18 Claims, 12 Drawing Sheets

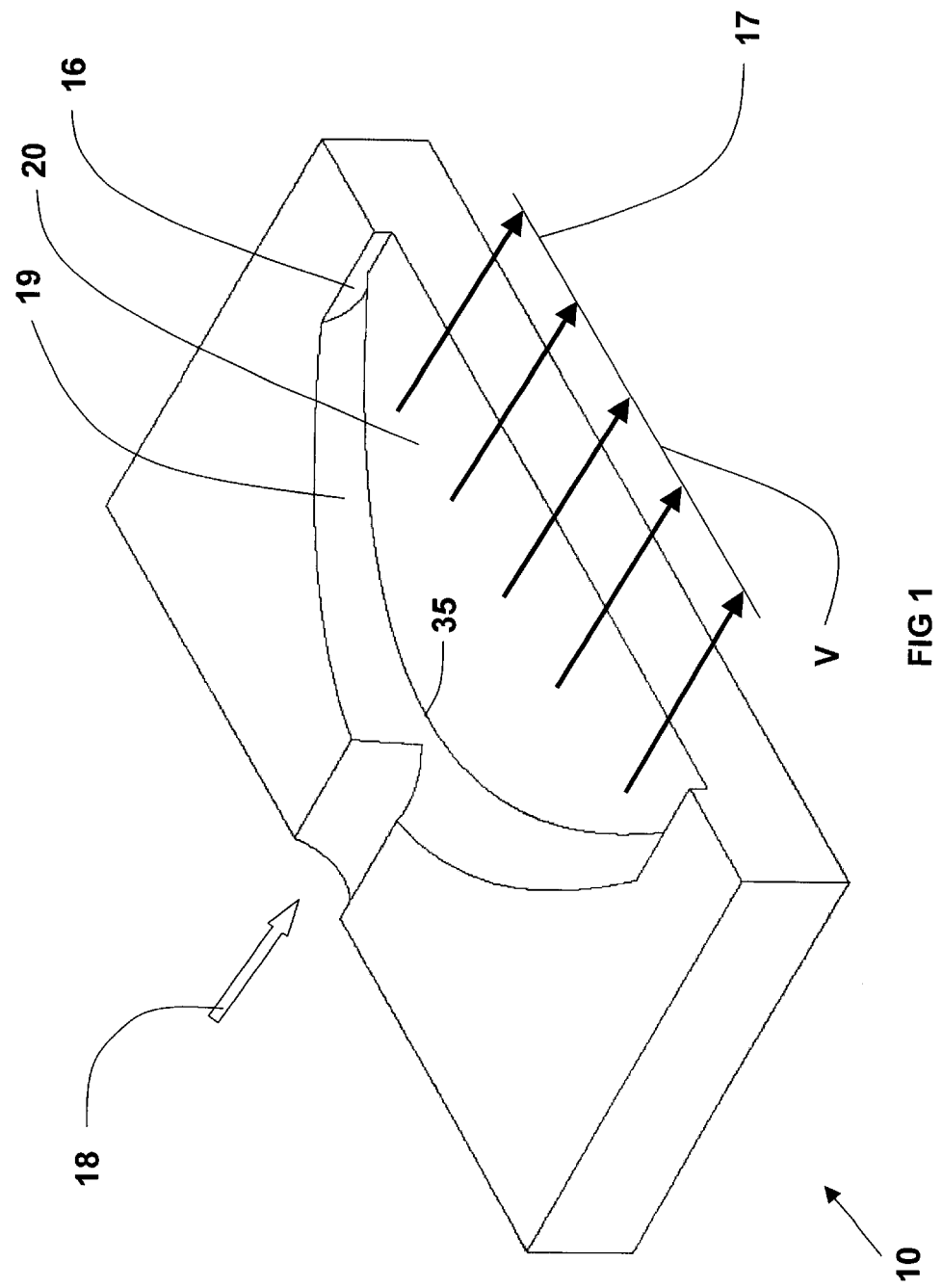

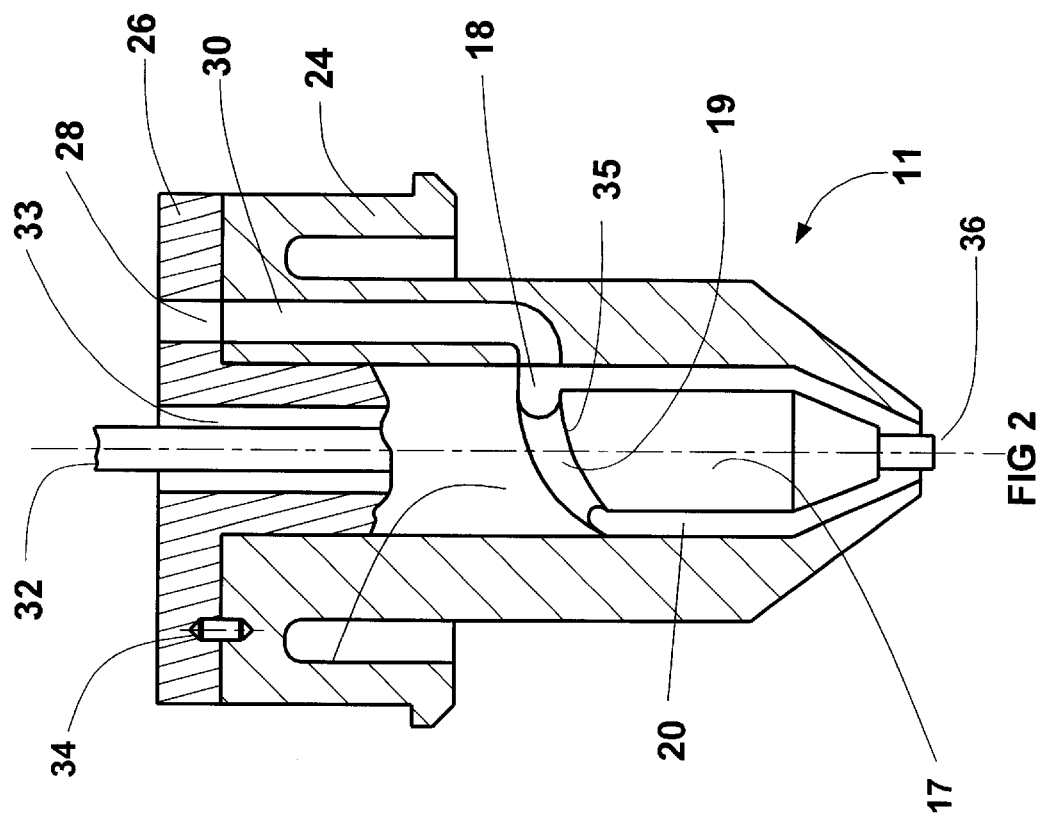

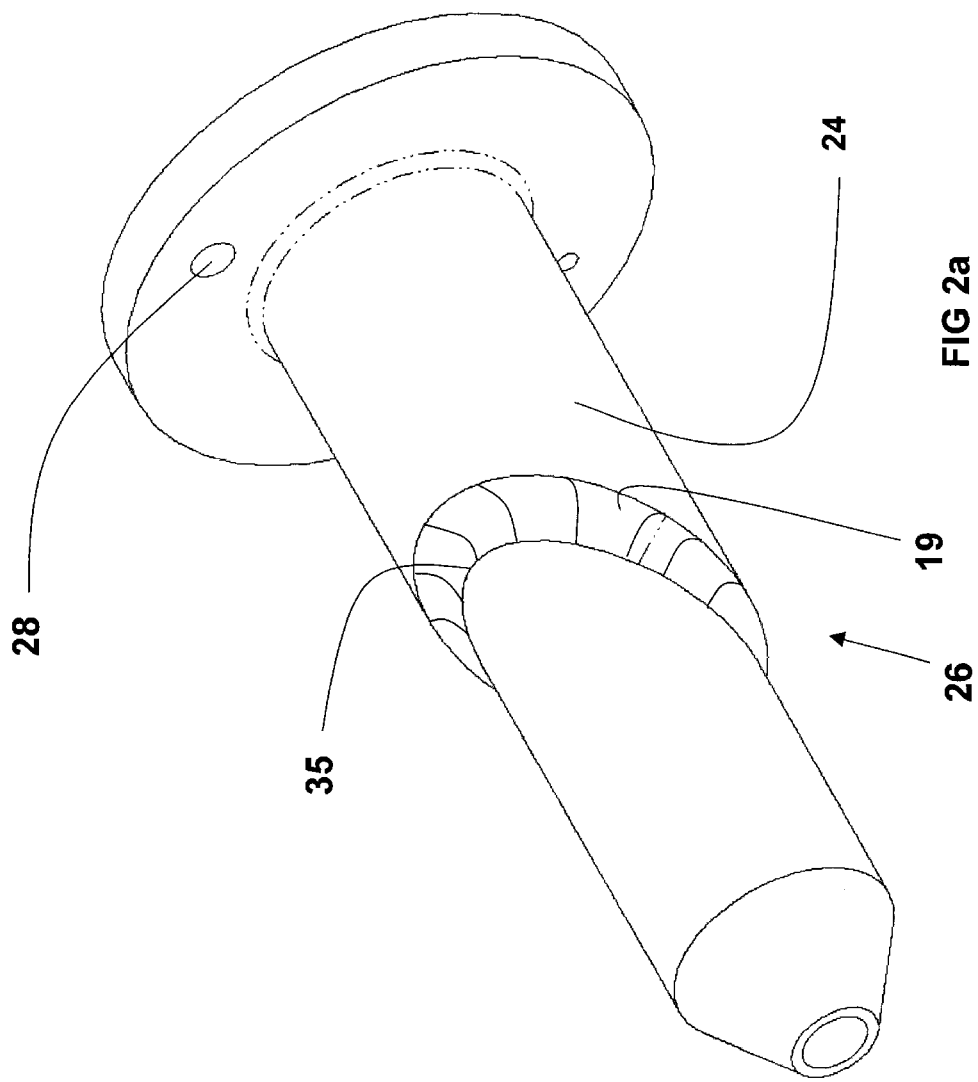

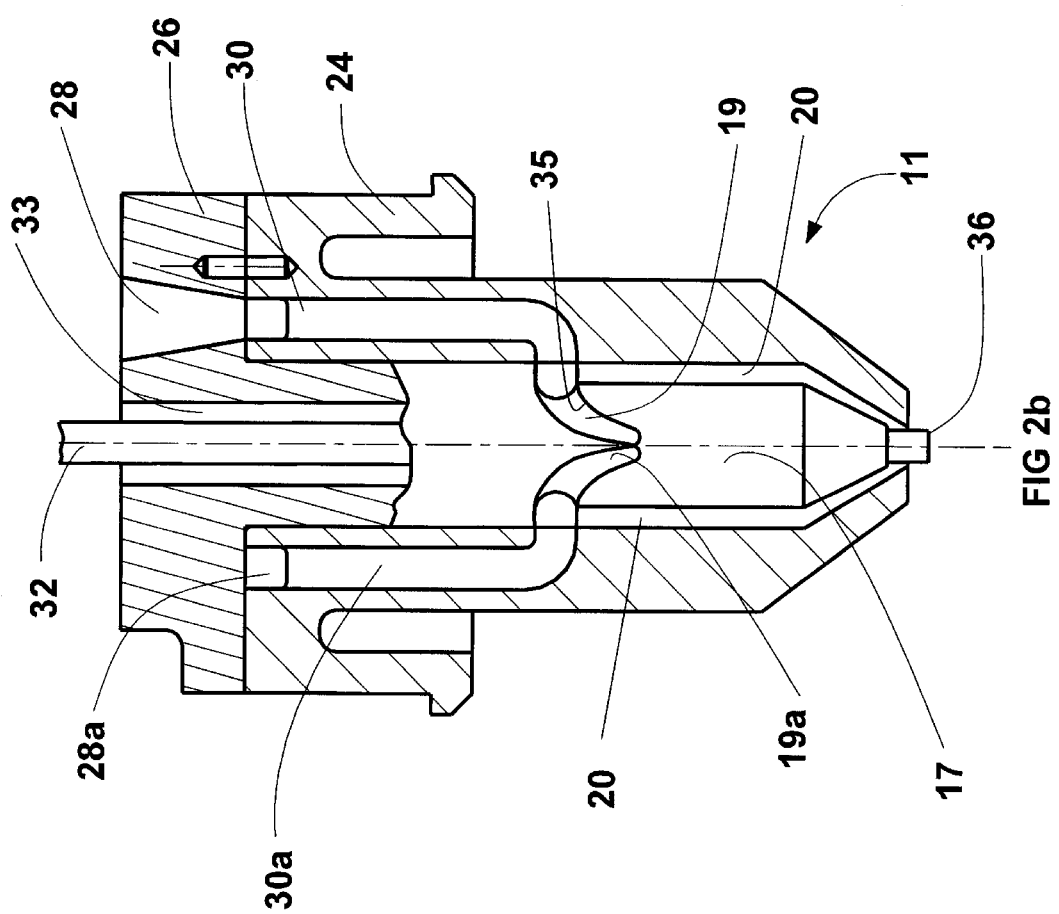

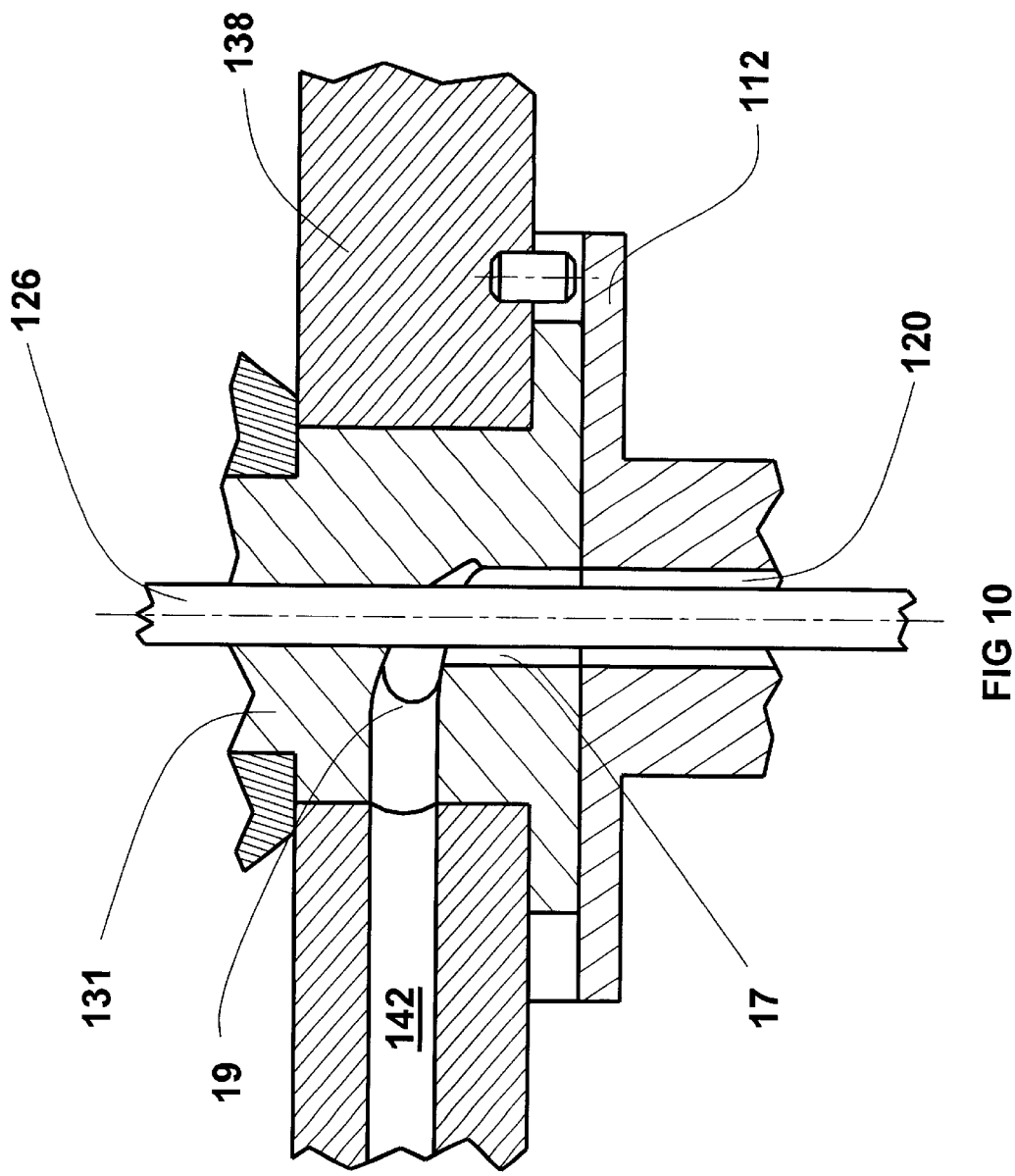

FLOW DEFLECTOR IN AN INJECTION MOLDING SYSTEM

CROSS-REFERENCE TO RELATED APPLICATIONS

This is a Continuation-in-Part of co-pending application Ser. No. 09/733,349 entitled "Flow Deflector Apparatus and Method", filed Dec. 8, 2000 by the present inventor and is incorporated herein by reference.

BACKGROUND OF THE INVENTION

1. Field of the Invention

This invention relates to an apparatus and method for converting the circular flow inside a melt channel to a uniform annular flow. More specifically, this invention relates to an apparatus and method for improving uniform melt flow and elimination of stagnation points as it passes through an injection molding system and/or hot runner system.

2. Summary of the Prior Art

The large number of variables in the injection molding process creates serious challenges to creating a uniform and high quality part. These variables are significantly compounded within multi-cavity molds. Here we have the problem of not only shot to shot variations but also variations existing between individual cavities within a given shot. Shear induced flow imbalances occur in all multi-cavity molds that use the industry standard multiple cavity "naturally balanced" runner system whereby the shear and thermal history within each mold is thought to be kept equal regardless of which hot-runner path is taken by the molten material as it flows to the mold cavities. These flow imbalances have been found to be significant and may be the largest contributor to product variation in multicavity molds.

Despite the geometrical balance, in what has traditionally been referred to as "naturally balanced" runner systems, it has been found that these runner systems can induce a significant variation in the melt conditions delivered to the various cavities within a multi-cavity mold. These variations can include melt temperature, pressure, and material properties. Within a multi-cavity mold, this will result in variations in the size, shape and mechanical properties of the product.

It is well known that providing for smooth flow of pressurized melt is critical to successful molding of certain materials. Sharp bends, corners or dead spots in the melt passage results in unacceptable residence time for some portion of the melt being processed which can cause too much delay on color changes and/or result in decomposition of some materials or pigments of some materials such as polyvinyl chloride and some polyesters or other high temperature crystalline materials. In most multi-cavity valve gated injection molding systems it is necessary for the melt flow passage to change direction by 90° and to join the bore around the reciprocating valve stem as it extends from the manifold to each nozzle.

These problems necessarily require fine tolerance machining to overcome and it is well known to facilitate this by providing a separate bushing seated in the nozzle as disclosed in U.S. Pat. No. 4,026,518 to Gellert. A similar arrangement for multi-cavity molding is shown in U.S. Pat. No. 4,521,179 to Gellert. U.S. Pat. No. 4,433,969 to Gellert also shows a multi-cavity arrangement in which the bushing is located between the manifold and the nozzle. Also shown in U.S. Pat. No. 4,705,473 to Schmidt, provides a bushing in which the melt duct in the bushing splits into two smoothly curved arms which connect to opposite sides of the valve member bore. U.S. Pat. No. 4,740,151 to Schmidt, et al. shows a multi-cavity system with a different sealing and retaining bushing having a flanged portion mounted between the manifold and the back plate.

U.S. Pat. No. 4,443,178 to Fujita discloses a simple chamfered surface located behind the valve stem for promoting the elimination of the stagnation point which would otherwise form.

U.S. Pat. No. 4,932,858 to Gellert shows a separate bushing seated between the manifold and the injection nozzle in the melt stream which comprises a melt duct with two smoothly curved arms which connect between the melt passage in the manifold and the melt passage around the valve stem in an effort to eliminate the stagnation points.

Reference should also be made to the following reference: "Extrusion Dies for Plastics and Rubber" by W. Michaeli, Carl Hanser Verlag, Munich, ISBN 3-446-16190-2 (1992).

There exists a need for a method and apparatus that substantially reduces the flow imbalances and stagnation points in an injection molding system and/or hot runner system that occurs as a result of the flow being diverted around a melt flow obstruction such as a valve stem, a nozzle, a nozzle tip, a valve stem guide, a torpedo, etc.

SUMMARY OF THE INVENTION

A flow deflector in a melt channel is provided, preferably around a valve stem or other flow obstruction, where the melt flow is converted from circular flow to annular flow. One preferred embodiment comprises a cylindrical body with a gradually constricting channel disposed on its outer surface. The channel is formed to be decreasing in depth and width, so as the melt flows into the channel, it gradually spills out of the channel. The gradual restriction of the channel helps direct the melt around the back of the cylindrical body which helps to eliminate stagnation points behind the flow obstruction while also providing uniform annular flow of the melt.

Further objections and advantages of the present invention will appear hereinbelow.

BRIEF DESCRIPTION OF THE DRAWINGS

FIG. 1 is a simplified view showing the basic principle of a coat-hanger manifold;

FIG. 2 is a partial sectional view of a preferred embodiment of the present invention in a co-injection hot runner nozzle;

FIG. 2A is a simplified isometric view of a preferred embodiment of the present invention;

FIG. 2B is a partial sectional view of another preferred embodiment of the present invention in a co-injection nozzle comprising two melt flow inlets;

FIG. 10 is a partial sectional view of another preferred embodiment of the present invention comprising a flow deflector formed in a bushing.

DETAILED DESCRIPTION OF THE PREFERRED EMBODIMENTS

Figure 3:
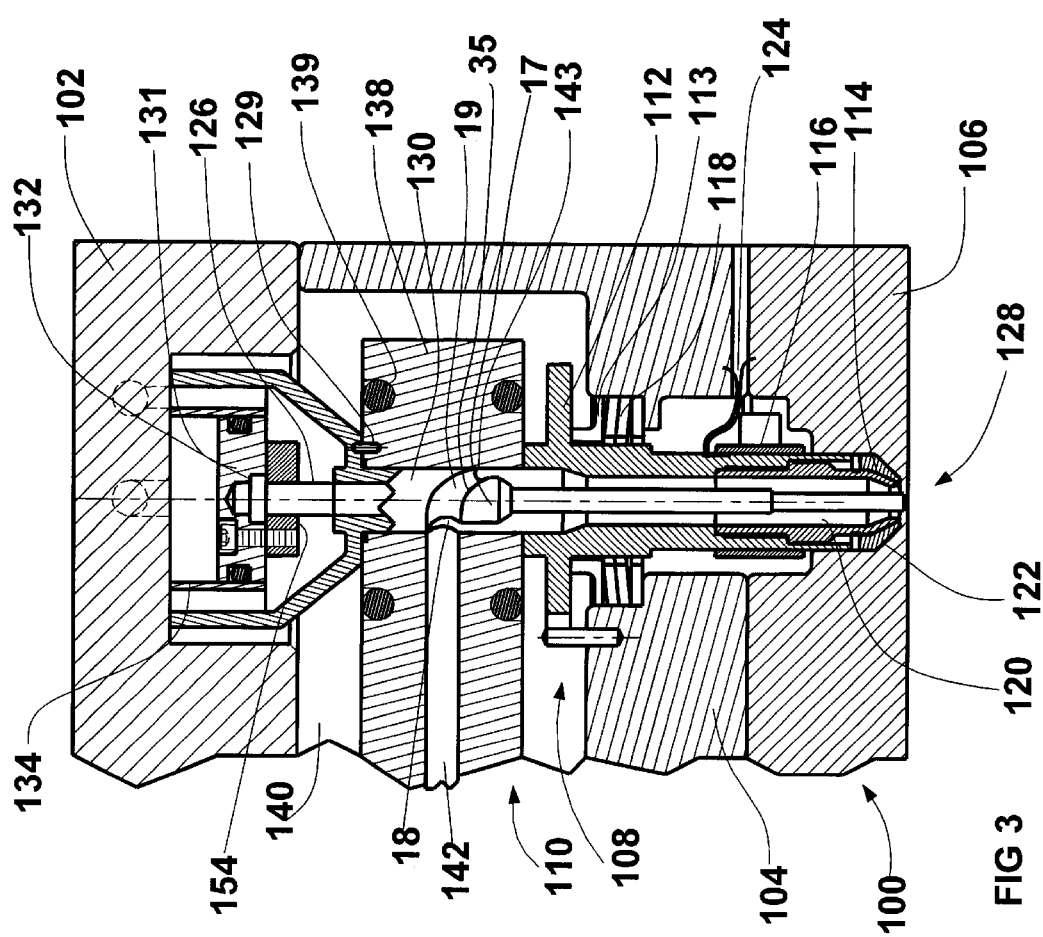
FIG. 3 is a sectional view of another preferred embodiment of the present invention comprising a valve-gated nozzle in an injection molding system.

Referring first to FIG. 1, a simplified flat construction is shown which depicts the basic principles behind the present invention. Similar to coat hanger manifold principles well known in the extrusion arts, the melt flow will enter at a predetermined angle to a channel 19 at a flow inlet 18. The melt will then split and flow equally down each side of the symmetrical channel 19 till it reaches an end 16 of the channel. The channel 19 is formed to have a decreasing cross section so as the melt travels down the channel 19, more and more of the melt will spill over and out of the channel 19 over lip 35 into annular area 20 toward exit 17. In this arrangement, the melt will reach exit 17 exhibiting substantially uniform flow V as shown by the arrows on the figure. In order to maintain a constant pressure drop as the melt travels through the channel 19, the volumetric flow rate in the channel 19 from the inlet 18 to the end 16 must fall off to zero in a linear fashion. To maintain uniform volumetric flow, annular area 20 is defined by a uniform cross-sectional area along its longitudinal axis.

Now referring to FIGS. 2, 2A and 2B, a co-injection hot runner nozzle 11 according to a preferred embodiment of the present invention is generally shown. This preferred embodiment is comprised of the device as shown in FIG. 1, which has been wrapped around the circumference of a deflector body 26. Deflector body 26 is concentric to and inserted into a nozzle body 24 and aligned with a second melt passage 30 such that the melt enters the flow inlet 18 substantially perpendicular to deflector body 26. This alignment is fixed by a locating pin 34. Locating pin 34 could be any suitable alignment means known in the art including (but not limited to) screws, rivets, spring pins, dowel pins, etc. Deflector body 26 further comprises a first melt passage 28 which is aligned with second melt passage 30 for communication of a first melt from an injection molding machine (not shown) or hot runner manifold (also not shown).

A valve stem 32 extends through a third melt passage 33 that is located inside of and runs the length of deflector body 26. Third melt passage 33 is provided to communicate the flow of a second melt into the mold cavity. Valve stem 32, as well known in the art, is selectively positioned through an up and down motion to start and stop the flow of the two melt streams through a nozzle outlet 36, thereby controlling the filling of the mold cavity. In this arrangement, popularly known as co-injection, a mold cavity may be filled with two or more different melts for effects such as multiple colors, different melt materials and the like.

As the melt flows from second melt passage 30 to flow inlet 18, it strikes the outside wall of the deflector body 26 substantially perpendicular to valve stem 32 longitudinal axis (However, non-perpendicular flow impingement could easily be accomplished). If channel 19 was not present, the melt would tend to flow down along the face of deflector body 26 closest to flow inlet 18, thereby causing stagnation points behind deflector body 26. However, in this preferred embodiment, the melt flows into channel 19 and is directed to flow around the deflector body 26, thereby eliminating the formation of stagnation points. As the melt flows through channel 19, the depth and width of the channel decreases so as to force more and more of the melt out of the channel 19 over lip 35. This gradually transitions the flow to annular flow through annular area 20 which has a uniform cross-section so that by the time the melt reaches the exit 17, a uniform velocity profile has been established which results in the formation of a high quality molded part.

In FIG. 2B, a dual inlet co-injection nozzle similar to that shown in FIG. 2 is shown. The significant difference between these two preferred embodiments is the use of an additional first melt passage 28a that is diametrically opposed to the other first melt passageway. It should be noted that the melt channels are not required to be diametrically opposed. In this embodiment, identical channels 19 and 19a are provided. In this arrangement, elimination of stagnation points and the creation of a uniform annular velocity is also achieved.

Referring to FIG. 3 (where like features have like numerals), another preferred embodiment in accordance with the present invention is generally shown. A hot runner valve gate system 100 for injecting plastic material into a mold or the like is illustrated. The system includes a backing plate 102 and a manifold plate 104. A mold base 106 is further attached to the manifold plate 104.

As the melt flows from melt channel 142 to flow inlet 18, it strikes the outside wall of the deflector housing 130 substantially perpendicular to valve stem 126 longitudinal axis (However, non-perpendicular flow impingement could easily be accomplished). If channel 19 was not present, the melt would tend to flow down along the face of deflector housing 130 closest to flow inlet 18, thereby causing stagnation points behind deflector housing 130. However, in this preferred embodiment, the melt flows into channel 19 and is directed to flow around the deflector housing 130, thereby eliminating the formation of stagnation points. As the melt flows through channel 19, the depth and width of the channel decreases so as to force more and more of the melt out of the channel 19 over lip 35. This gradually transitions the flow to annular flow so that by the time the melt reaches the exit 17, a uniform velocity profile has been established which results in the formation of a high quality molded part.

As shown in FIG. 3, the nozzle assembly 108 consists of a nozzle body 112, a tip 114, a nozzle heater 116, a spring means 118, and a nozzle insulator 113. The nozzle body 112 is typically made of steel, while the tip 114 may be formed from any suitable highly heat-conductive material known in the art such as beryllium/copper. The nozzle body 112 has an axial channel 120 through which molten plastic material flows. The tip 114 surrounds a terminal part of the axial channel 120.

If desired, the nozzle tip 114 may include a sheath 122 for thermally insulating the downstream end of the nozzle tip 114. The sheath 122 may be formed from a resinous material which may be prefabricated. Alternatively, the sheath 122 may be formed from an overflow of injected resin in the first operating cycle or cycles. The nozzle insulator 113 is installed within a cavity of the manifold plate 104 and acts to reduce the thermal communication between the nozzle body 112 and the manifold plate 104, thereby maintaining the high temperature of the molten plastic material as it flows through the axial channel 120. The nozzle insulator 113 may be formed from any suitable insulating material, typically known in the art such as titanium.

The nozzle heater 116 may be any suitable electric heater known in the art to which current is admitted by way of a cable 124. As shown in FIG. 3, the nozzle heater 116 surrounds a portion of the nozzle body 112.

A valve stem 126 is provided to permit opening and closing of the gate 128 in the nozzle body 112. The valve stem 126 may be formed by a steel rod that extends through a passageway in the deflector housing 130 and into the nozzle body 112. The end of the valve stem 126 opposite to the gate 128 is connected to a piston head 131 by a set-screw 154.

The piston head 131 is housed within a cylinder housing which comprises the upper distal end of deflector housing 130 and formed by cylindrical wall 134. Downstroke of the piston head 131 causes the valve stem 126 to move into a position where it closes or reduces the cross sectional area of the gate 128 so as to restrict flow of the molten plastic material. Upstroke of the piston head 131 causes the valve stem 126 to move so as to increase flow of the molten plastic material through the gate 128.

The hot runner system of this preferred embodiment also includes a manifold/deflector arrangement 110 consisting of the manifold 138 and the deflector housing 130 inserted into bore 143 therein. A locating pin 129 fixes the alignment of the deflector housing 130 to the melt channel 142. The manifold 138 is formed by a distribution plate housed between the plates 102 and 104 but separated therefrom by an air gap 140. The backing plate 102 is rigidly affixed to the manifold plate 104 by a plurality of high strength bolts (not shown) which must withstand the large forces generated during the cyclic molding process.

The manifold includes the melt channel 142 forming part of the hot runner system for transporting molten plastic material from a source (not shown) to the gate 128 associated with a respective mold or molds. The manifold further includes the bore 143 into which deflector housing 130 is inserted. The manifold 138 may be formed from any suitable metal or heat conducting material known in the art. The manifold heater 139 is well known in the art and typically comprises a wire/ceramic resistive type heater with a cylindrical cross section that is seated into a groove of the manifold 138.

The deflector housing 130 surrounds and guides a portion of the valve stem 126. This is an important advantage of the present invention because this increased valve stem support reduces valve stem wear and will significantly increase the life of the valve stem. Increased valve stem life will result in reduced maintenance costs and machine downtime.

The deflector housing 130 is formed from any suitable material known in the art (usually steel) and is designed to be inserted into the manifold 138 from the top. As shown in FIG. 3, the deflector housing channel 19 mates with the melt channel 142 in the manifold 138 and the axial channel 120 in the nozzle assembly 108.

As the melt flows from melt channel 142 to flow inlet 18, it strikes the outside wall of the deflector housing 130 substantially perpendicular to valve stem 126 longitudinal axis (However, non-perpendicular flow impingement could easily be accomplished). If channel 19 was not present, the melt would tend to flow down along the face of deflector housing 130 closest to flow inlet 18, thereby causing stagnation points behind deflector housing 130. However, in this preferred embodiment, the melt flows into channel 19 and is directed to flow around the deflector housing 130, thereby eliminating the formation of stagnation points. As the melt flows through channel 19, the depth and width of the channel decreases so as to force more and more of the melt out of the channel 19. This gradually transitions the flow to annular flow so that by the time the melt reaches the exit 17, a uniform velocity profile has been established which results in the formation of a high quality molded part.

It should be noted that even though the preceding embodiments describe a deflector body 26 (FIG. 2) that is separate from the nozzle body 24 (FIG. 2), a single bushing could easily be fabricated that incorporates all the required features.

Figure 4:
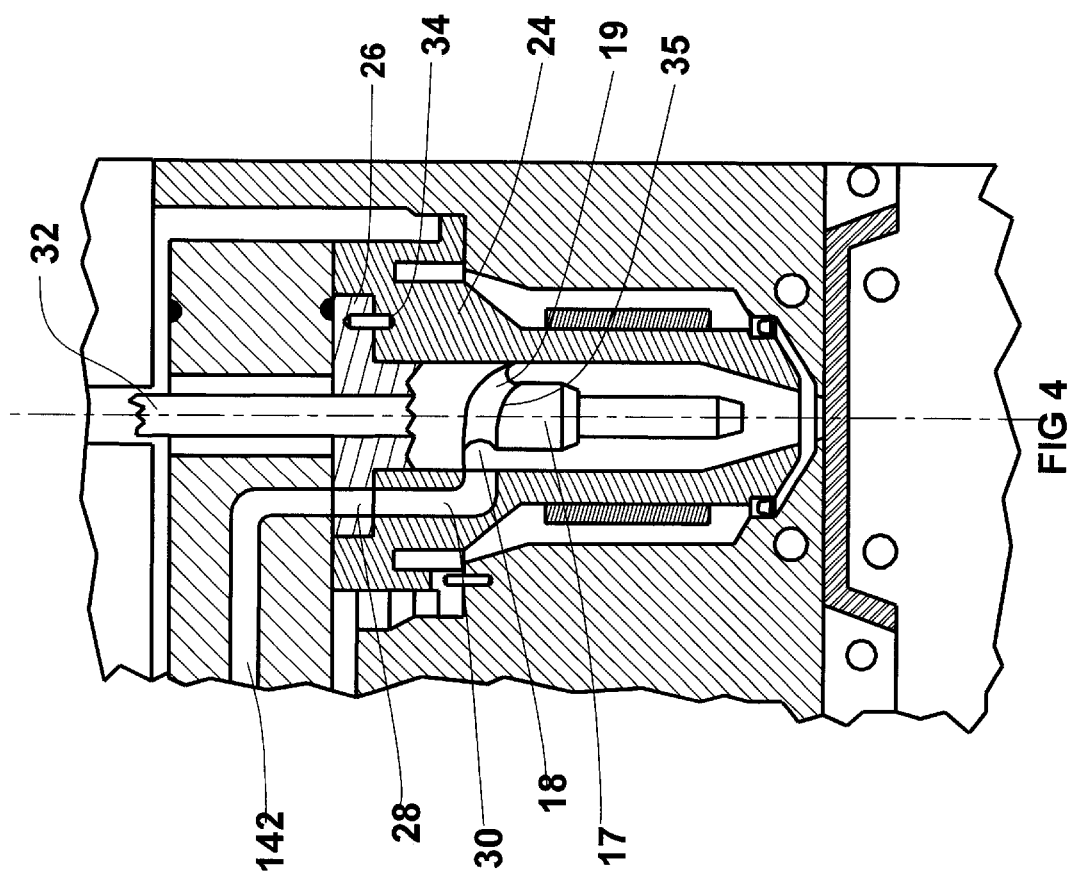
FIG. 4 is a sectional view of another preferred embodiment of the present invention comprising a valve-gated nozzle assembly.

Referring now to FIG. 4 (where like features have like numerals), another preferred embodiment in accordance with the present invention is generally shown. In this embodiment, the deflector body 26 is a singular bushing that is inserted in the nozzle body 24 for a single-melt nozzle.

Here again, the valve stem 32 is inserted through the deflector body 26, thereby supporting and guiding the valve stem 32 while also directing the melt around the back of the valve stem. Similar to the previous embodiments, melt flows from melt channel 142 through the first melt passage 28 which is located in the upper flange of the deflector body 26. Alignment between melt channel 142 and first melt passage 28 is maintained by locating pin 34. The melt then flows through second melt passage 30 which is located inside nozzle body 24.

The melt is then directed against deflector body 26 at inlet 18 where the flow is diverted around to the back of the valve stem 32 by channel 19. The melt flow is diverted through the channel 19 and gradually spills out of channel 19 over lip 35 into annular area 20 such that when it reaches exit 17 of the deflector body 26, it has been transformed from circular flow to uniform annular flow which exits nozzle outlet 36 to form a high quality, molded part.

Figure 5:
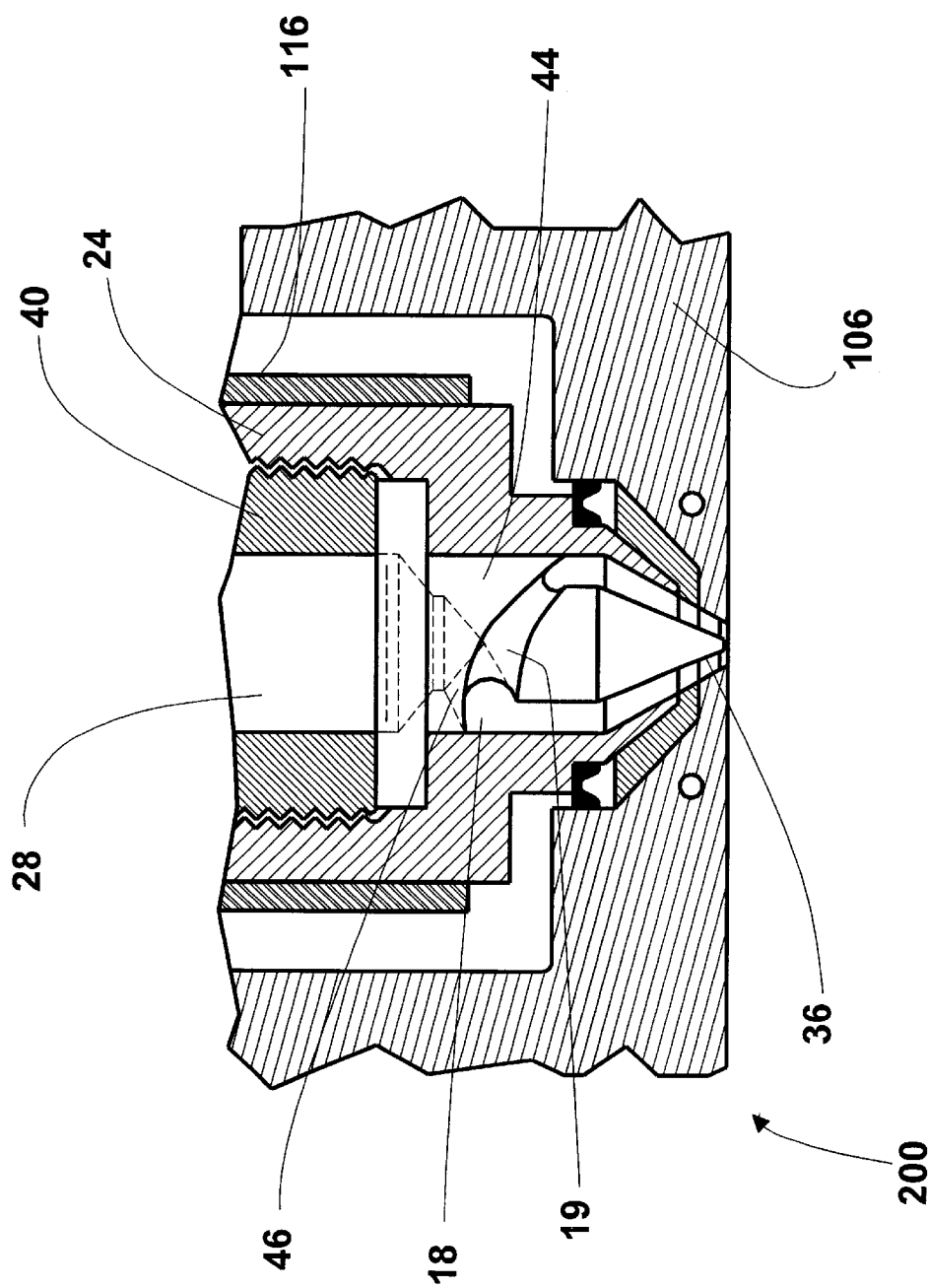
FIG. 5 is a cross-sectional view of another preferred embodiment of the present invention comprising a nozzle tip assembly of a hot runner nozzle.
Figure 6:
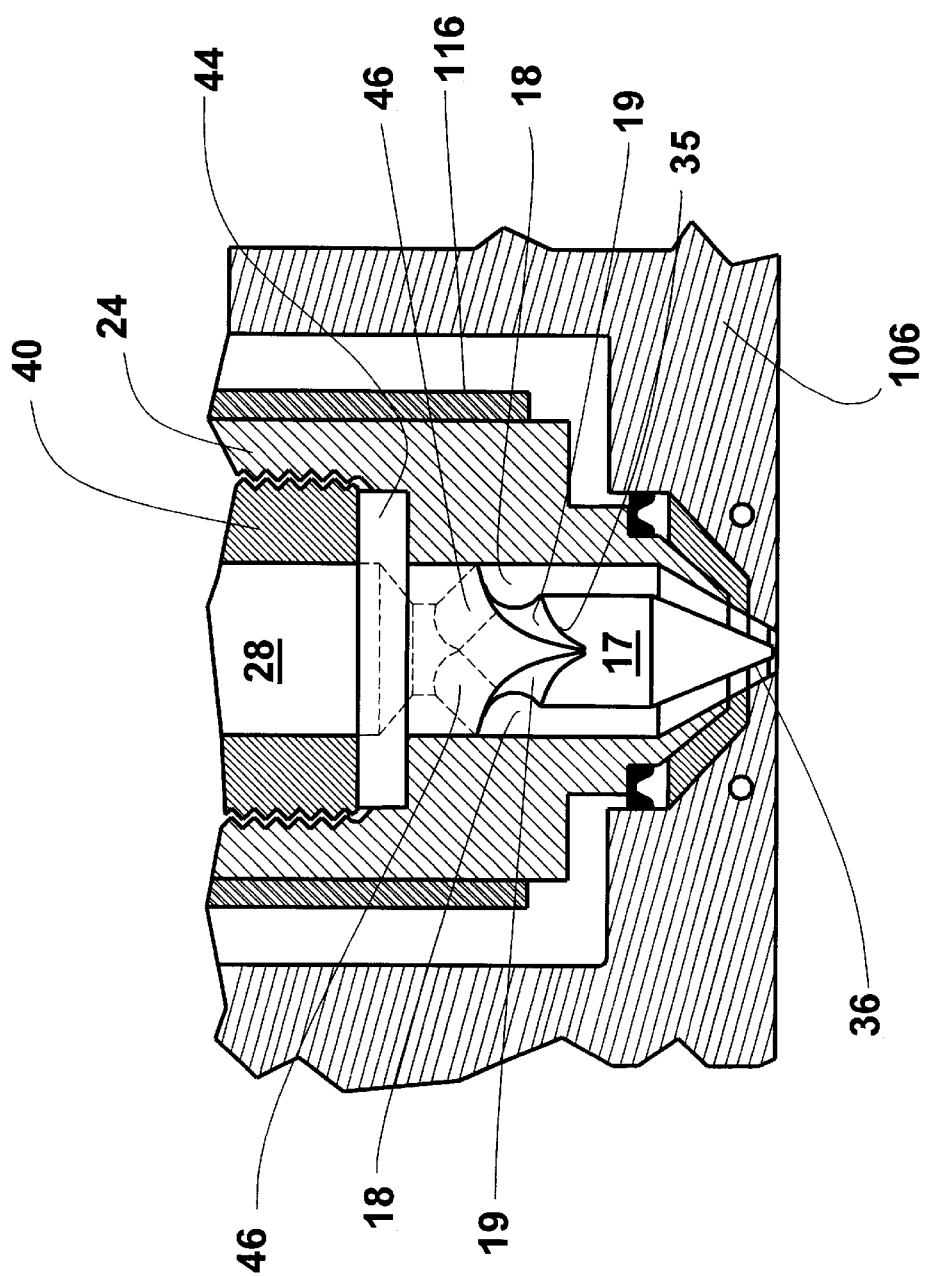
FIG. 6 is a partial cross-sectional view of another preferred embodiment of the present invention comprising a nozzle tip with two melt flow inlets.

Referring now to FIGS. 5 and 6, (where like features have like numerals) another preferred embodiment of the present invention is shown comprising an injection molding nozzle tip assembly 200. In this embodiment, the principles of coat hanger manifolds previously discussed have been applied to the tip of an injection nozzle assembly. Commonly referred to as a "hot tip" or "pin point", this preferred embodiment comprises a nozzle without the valve stem as shown in the previous embodiments.

An elongated first melt passage 28 is located in a sleeve 40 for the communication of a melt to a tip 44. The sleeve 40 is rigidly affixed inside the nozzle body 24 and traps the tip 44 co-axially in the nozzle body 24. In the preferred embodiment, the sleeve is threaded into the nozzle body 24 and abuts against a top flange of tip 44. A heater 116 is wrapped around the outside of nozzle body 24 for maintaining the temperature of the melt as it flows through the nozzle assembly.

Melt flows through first melt passage 28 and is further communicated to flow inlet 18 through a tip passage 46. The flow is thus communicated to channel 19. In this arrangement, the melt flow exits nozzle outlet 36 as a uniform annular flow. Elimination of stagnation points behind the tip 44 is accomplished by forcing the melt to flow around to the back of the tip 44.

Referring to FIG. 6, a nozzle assembly similar to FIG. 5 is shown, except for the addition of a second tip passage 46 which communicates the melt flow to two sides of the tip 44. In addition, a second symmetrical channel 19 is provided. Here again, the melt flows into the channel 19 and gradually spills over lip 35 into all annular flow by the time it reaches exit 17.

Figure 7B:
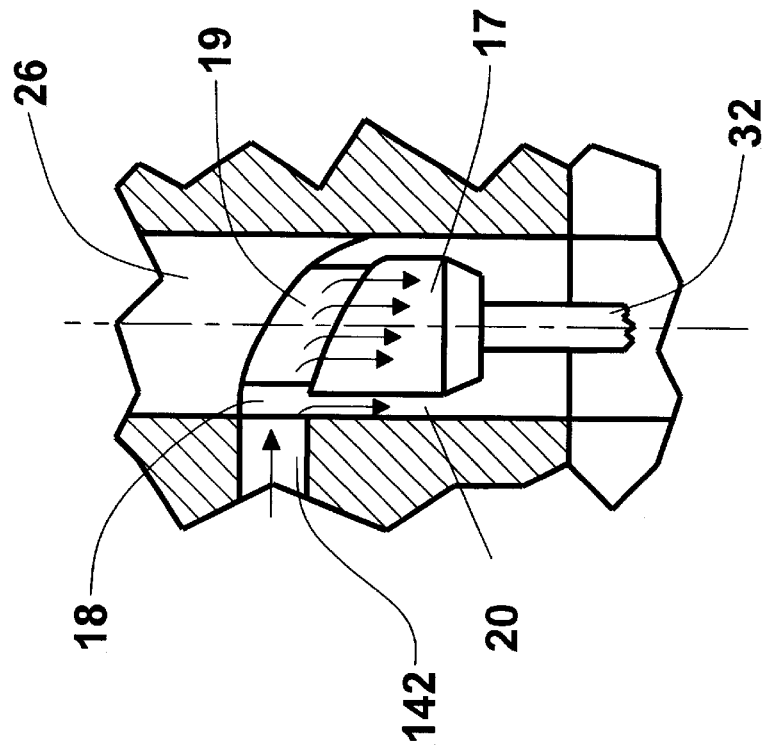
FIGS. 7a and 7b are partial cross-sectional views of the flow deflector in accordance with the present invention.
Figure 7A:
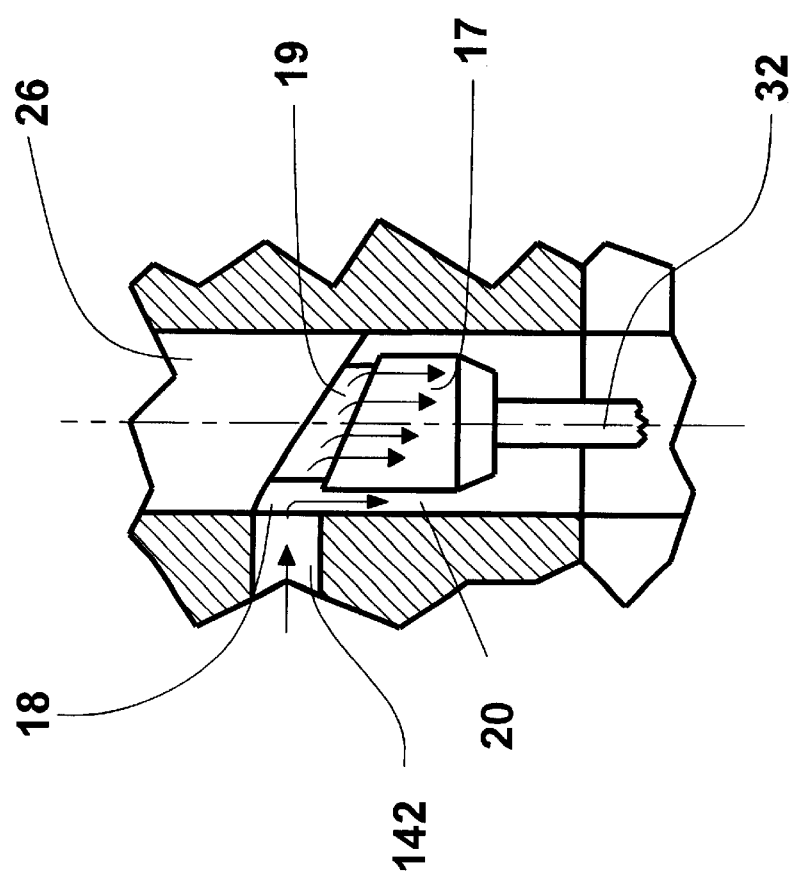

Referring to FIGS. 7a and 7b, another preferred embodiment in accordance with the present invention is shown. In these embodiments, the channel 19 is not formed from a groove having a curved profile but instead is a square groove profile. In FIG. 7a, the channel 19 slopes downward at a fixed angle whereas in FIG. 7b, the channel 19 has a radius which defines the path of the channel 19 along the deflector body 26.

Figure 8:
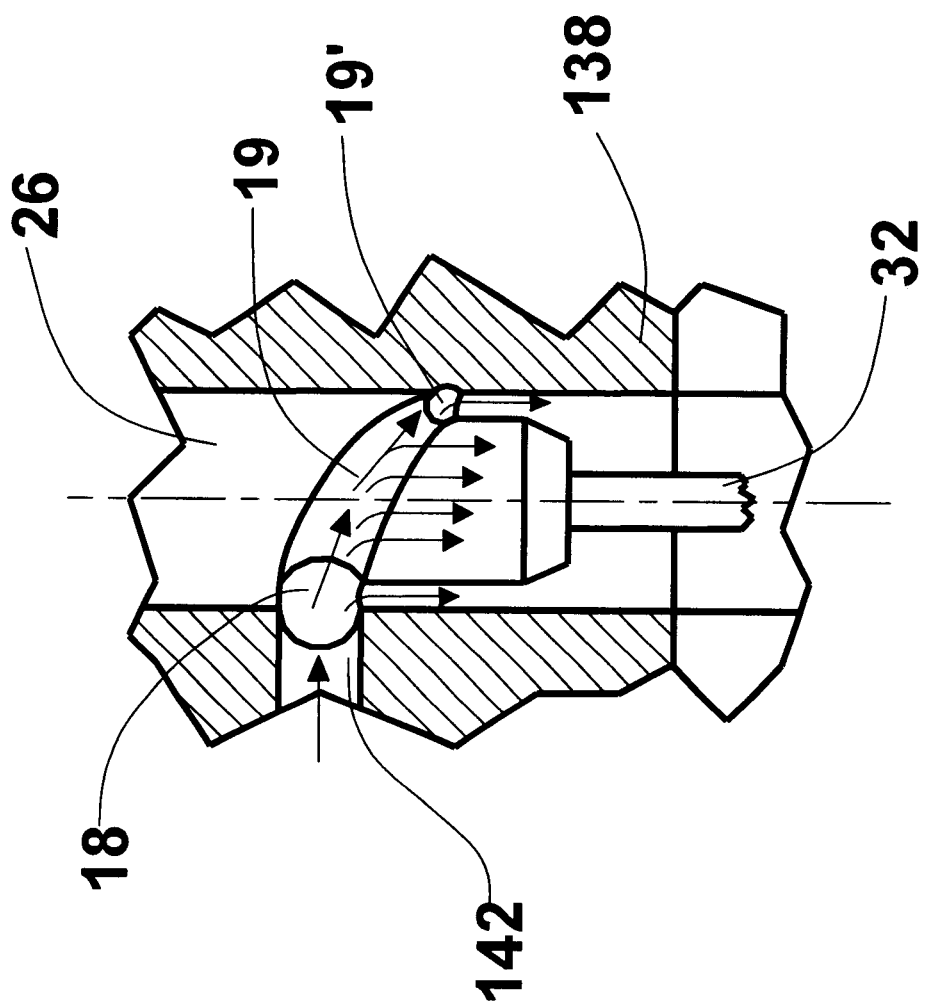
FIG. 8 is a partial cross-sectional view of the flow deflector in accordance with a preferred embodiment of the present invention.

Referring to FIG. 8, another preferred embodiment in accordance with the present invention is shown. In this embodiment, an opposing channel 19' is formed in the manifold 138 for further directing the melt flow around the deflector body 26. Channel 19 and 19' in combination form a deeper channel to direct the melt around the back of the deflector body 26. Here too, the melt gradually spills out of the channels 19 and 19' to convert the flow to uniform annular flow while eliminating stagnation points. Due to melt flow principles, this embodiment will exhibit the least amount of variations in melt properties and will produce molded parts with the least amount of variation.

Figure 9:
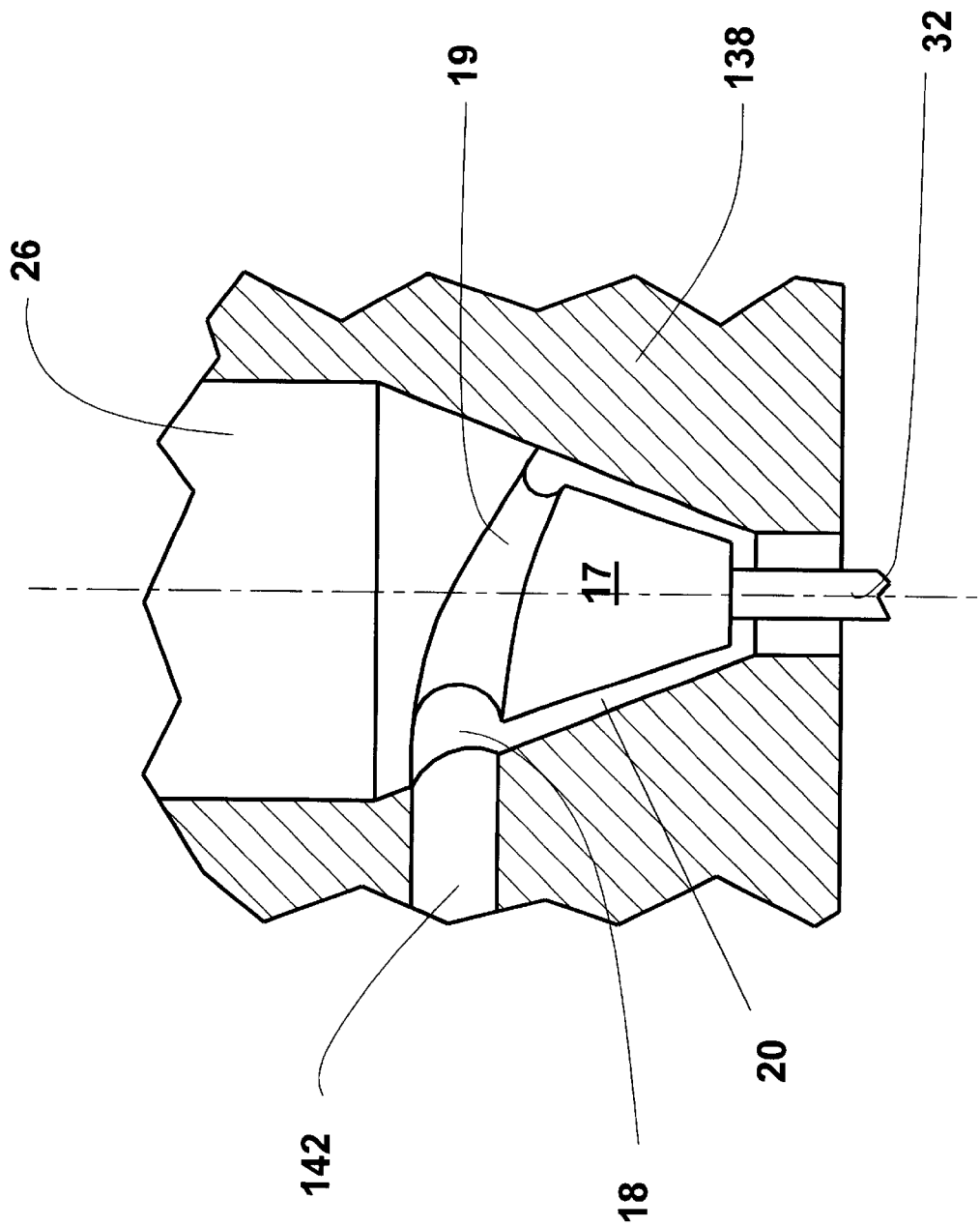
FIG. 9 is a partial sectional view of another preferred embodiment of the present invention comprising an injection nozzle assembly having a tapered surface.

Referring now to FIG. 9 (where like features have like numerals), another preferred embodiment of the present invention is shown which comprises a deflector body 26 which has a tapered flow surface. Coat hanger manifold principles have shown that a tapered flow surface, especially in the area of the channel 19, helps to substantially reduce the pressure drop that occurs in the melt as it is diverted around a flow obstruction. The tapered deflector body 26 is inserted into a tapered receiving hole in the manifold 138, and alignment is maintained by the abutting tapered surfaces. A locating pin, similar to that shown in previous embodiments may also be used to further maintain the deflector body 26 alignment with the melt channel 142.

This tapered channel arrangement could also be utilized in the all aforementioned embodiments. These embodiments could all incorporate the use of the tapered flow surface to reduce the melt pressure drop as it flows around obstacles.

While the previous embodiments all show the use of the channel 19 on a deflector body 26 that is wrapped around a valve stem 32, the channel 19 could easily be placed directly on the outside surface of the valve stem 32. A disadvantage to this approach however is the reduction in the valve stem support provided by the deflector housing that may lead to accelerated wear of the valve stem. In addition to this drawback, it would also be necessary to incorporate an alignment feature to maintain alignment of the valve stem with the manifold channel.

Referring now to FIG. 10, another preferred embodiment in accordance with the present invention is shown wherein the channel 19 is formed integral to a bushing 131. In this embodiment, the channel 19 directs the melt to flow around the valve stem 126 rather than a deflector body. This embodiment reduces the additional valve stem support as shown in previous embodiments.

It is to be understood that the invention is not limited to the illustrations described herein, which are deemed to illustrate the best modes of carrying out the invention, and which are susceptible to modification of form, size, arrangement of parts and details of operation. The invention is intended to encompass all such modifications, which are within its spirit and scope as defined by the claims.

What is claimed is:

1. In an injection molding system, a flow deflector in the stream of a flowing melt comprising:
    a deflector body having a flow inlet, a flow exit, and at least one deflector channel between said inlet and said exit;
    said channel having a lip and decreasing in cross-sectional area such that the flowing melt directed through the channel gradually spills over the lip and exhibits substantially uniform velocity at said flow exit.

2. The flow deflector of claim 1 wherein said exit is comprised of a uniform annular cross-sectional area.

3. The flow deflector of claim 1, further comprising a valve stem slidably inserted into the deflector body and operatively positioned to start and stop the flow of said melt, said deflector channel being formed on an outside surface of said deflector body.

4. The flow deflector of claim 3, wherein said deflector body is tapered.

5. The flow deflector of claim 1, further comprising a valve stem slidably inserted into the deflector body and operatively positioned to start and stop the flow of said melt, said deflector channel being formed on the outside surface of said valve stem.

6. The flow deflector of claim 3, wherein:
    said deflector body is installed in a nozzle body and has a third melt passage therein which receives the valve stem, said valve stem operatively extending through said deflector body to a nozzle outlet of said nozzle body;
    said nozzle body has a second melt passage therein; and
    said deflector body having a first melt passage for communication of said melt to said second melt passage, where the second melt passage directs the melt toward the deflector channel.

7. The flow deflector of claim 6, further comprising a locating pin for maintaining alignment of said first melt passage to said second melt passage and to said flow inlet.

8. The flow deflector of claim 6, wherein:
    said nozzle body has an additional second melt passage;
    said deflector body has an additional first melt passage for communication of said melt to said additional second melt passage;
    said deflector body has an additional substantially symmetrical deflector channel formed on the outside of said deflector body for the communication of said melt to said flow exit; and
    said deflector body has an additional flow inlet for communication of said melt through said additional deflector channel.

9. The flow deflector of claim 8 further comprising a locating pin for maintaining the alignment of said first melt passages to said second melt passages and to said flow inlets.

10. In an injection molding system, a flow deflector comprising:
    a heated hot runner manifold affixed between a manifold plate and a backing plate for communication of a flowing melt to at least one nozzle assembly by at least one melt channel;
    at least one deflector housing inserted into said manifold, said deflector housing further comprising:
        a flow inlet in alignment with said melt channel for communication of said melt to a flow exit;
        a deflector channel having a lip and reducing cross-sectional area in the direction of travel of said melt, located between said inlet and exit, said melt flowing over said lip to be substantially uniform velocity at said flow exit; and
        a valve stem operatively extending through said deflector housing to a nozzle outlet of said nozzle assembly, said valve stem controlling the flow of said melt.

11. The flow deflector of claim 10, further comprising a piston head affixed to said valve stem for the movement of said valve stem to open and close said nozzle outlet.

12. The flow deflector of claim 11, further comprising a heater in thermal communication with said nozzle assembly.

13. The flow deflector of claim 11, further comprising a locating pin for maintaining the proper alignment of said melt channel with said flow inlet.

14. The flow deflector of claim 13, further comprising a spring means in communication with said nozzle assembly for urging said nozzle assembly against said manifold.

15. In an injection molding system, a flow deflector comprising;

- a nozzle bushing inserted in a cavity of a manifold plate, said nozzle bushing having a flow inlet and a nozzle outlet;
- a deflector body inserted in a cavity of said nozzle bushing, said deflector body being aligned with said flow inlet for communication of a flowing medium to said nozzle outlet;
- a deflector channel with a lip formed on a surface of said deflector body adjacent said flow inlet, thereby urging the medium to flow over the lip and around said deflector body, wherein;
- said flowing medium exhibits substantially uniform velocity at said outlet.

16. The flow deflector of claim 15, further comprising:

an elongated valve stem operatively positioned in said deflector body and running adjacent to said nozzle outlet;

wherein said valve stem may be selectively positioned to control the movement of the flowing medium through said nozzle outlet.

17. The flow deflector of claim 16, wherein said valve stem is located co-axially to said nozzle body and said deflector body.

18. In an injection molding system, a flow deflector in a nozzle assembly comprising;

- a nozzle body having a nozzle tip disposed co-axially in a distal end of said nozzle assembly adjacent a nozzle outlet;
- a sleeve having a first melt passage, said sleeve disposed co-axially in said nozzle body adjacent said nozzle tip, said first melt passage in communication with said nozzle tip for transfer of a flowing medium to said nozzle outlet;
- two tip passages in said nozzle tip aligned with and communicating said medium from said first melt passage to two flow inlets;
- two deflector channels adjacent said flow inlet formed on a surface of said nozzle tip thereby forcing the medium to flow around said nozzle tip;
- wherein said flowing medium exhibits substantially uniform annular flow as it exits said nozzle outlet.

* * * * *